United States Patent

Wilson

[11] 3,903,735
[45] Sept. 9, 1975

[54] SLOPE ERROR COMPENSATING APPARATUS FOR USE WITH PROFILE MEASURING EQUIPMENT

[75] Inventor: Gardner P. Wilson, El Monte, Calif.
[73] Assignee: Gould Inc., Cleveland, Ohio
[22] Filed: Jan. 25, 1974
[21] Appl. No.: 436,527

[52] U.S. Cl. .............................. 73/105; 328/165
[51] Int. Cl.² ........................................ G01B 5/28
[58] Field of Search ............... 73/105; 328/165, 167

[56] References Cited
UNITED STATES PATENTS

| | | | |
|---|---|---|---|
| 3,529,240 | 9/1970 | Sanders | 73/105 X |
| 3,571,579 | 3/1971 | Whitehouse et al. | 73/105 X |
| 3,641,444 | 2/1972 | Watts | 328/165 X |

Primary Examiner—James J. Gill
Attorney, Agent, or Firm—George J. Netter, Esq.

[57] ABSTRACT

Incoming signals from profile measuring equipment, including both high-frequency information as to the profile of a part being measured and low-frequency slope data, is passed through a low-pass filtering circuit which preserves only the slope. The filtered output is fed into a sample and hold circuit which senses the orthogonal components $V_z$ and $V_x$ measured over a preselected period of time compatible with the stylus sweep time of the profile measuring equipment. The values $V_z$ and $V_x$ are next entered into a divider circuit, the output of which, $V_o$, is an electric signal corresponding to the slope of the input information from the profile measuring equipment. Subtraction from the initial composite signal leaves only profile information. Logical gating circuits are provided which sense a traverse reversal in the profile measuring equipment during the "on" time and actuate a warning light which tells the operator to ignore that run and recompute the data.

11 Claims, 8 Drawing Figures

SLOPE ERROR COMPENSATING APPARATUS FOR USE WITH PROFILE MEASURING EQUIPMENT

The present invention relates generally to profile measuring equipment, and, more particularly, to apparatus for modifying the electrical output signal of such profile measuring equipment to automatically maintain them within predetermined limits and eliminate the effect of a workpiece being oriented in non-parallelism to the equipment reference ways.

BACKGROUND OF THE INVENTION

Profile measuring and recording equipment is available which can provide an indication of the flatness or surface condition of a metal part to within a high degree of accuracy. For example, such profile measuring equipment can provide a graphic recording of the surface of a workpiece indicating variations from, say, true flat condition to within one-millionth of an inch. In such equipment, a stylus is maintained in surface contacting relation with the workpiece or part being tested for its profile condition while it is swept or scanned across the part surface to cover the entire test area. The stylus is referenced in the profile analyzing equipment to a bar having a precisely formed surface and produces an electric signal output having a functional relation to the variation in movement of the stylus normal to the part surface as it passes thereover.

A common difficulty in the use of such equipment is that of initially setting up the part or workpiece surface exactly parallel with the reference ways of the profile measuring equipment. This is necessary since even a very small variance from true parallelism will be read out by the stylus as a variation in flatness or profile of the surface of the test part due to the exceptionally high magnification inherent in the equipment. More particularly, if the part surface to be tested is arranged at an angle with respect to the reference ways of the profile measuring equipment, the signal output of the instrument as viewed on a strip recorder, for example, will not only include the information corresponding to profile changes, but also that caused solely by the slope of the non-parallelism. As a result, a tedious, time-consuming and difficult operation is necessary to establish this parallelism.

In the past, initial adjustments to eliminate slope of the part being tested with the profile measuring reference bar have been achieved primarily through physical relocation of the part or the equipment reference ways. In such a situation, the part was placed in an initial orientation while scans were made by the stylus and any slope was removed by repositioning of the part or relative repositioning of the instrument with respect to the part. This procedure usually required several such adjustments, not only to remove slope, but also to correct for vertical height changes of the stylus with respect to the surface being monitored. At best, even with an experienced operator, several minutes may be required for initial set-up, which, in the case of production runs for large numbers of parts, can be a substantial factor in production cost.

OBJECTS AND SUMMARY OF THE INVENTION

It is, therefore, a primary object and aim of this invention to provide electrical apparatus for removing the slope from the signal output of profile measuring eqipment which is produced by out-of-parallelism of the surface being measured and the equipment reference surface.

Another object of the present invention is the provision of apparatus for automatically adjusting the slope of an analog signal including high-frequency information.

A still further object of the invention is the provision of electrical means for leveling a signal output of profile measuring equipment which is inexpensive to manufacture, simple to use, accurate and reliable.

The above and other objects of the present invention are provided by apparatus which examines incoming electrical signal data from profile measuring equipment while it is monitoring a surface. The slope of the incoming data from the profile measuring equipment is determned both as to amplitude and sign, e.g., sloping upward or sloping downward. A ramp signal is generated having a slope equal to that of the signals obtained from the profile measuring equipment. The ramp signal is then mixed with the incoming signal in subtractive relation, whereby the resulting signal includes nothing but high-frequency information relating to the actual profile of the part or workpiece being examined with the slope removed. The profile data is then recorded on a pen or chart recorder, for example.

More particularly, the incoming signals from the profile measuring equipment, including both high-frequency information as to the actual profile of the part being measured and the low-frequency slope data, is passed through a low-pass filtering circuit which removes most of the high-frequency information, preserving only the information which is substantially entirely the slope representative of the non-parallelism of the part being tested with the reference ways of the instrument. The output of the low-pass filter (integrator) is fed into a sample and hold circuit which senses the orthogonal components $Vz$ and $Vx$ measured over a preselected period of time compatible with the stylus sweep time from a zero starting point, which information is then stored. The values $Vz$ and $Vx$ are next entered into a divider circuit, the output of which, $Vo$, is an electric signal corresponding to the slope of the input information from the profile measuring equipment.

At the start of each test run, a ramp generator is started, which ramp signal is fed into one input of a multiplier, with another input terminal being connected with the output of the divider circuit. The resultant or output of the multiplier ($Vmr$) is a new ramp signal corresponding to the original ramp generator signal multiplied by $Vo$. The multiplied ramp signal ($Vmr$), on being fed into a mixer, is subtracted from the input signal, leaving a result which corresponds to the profile signal information from the profile measuring equipment without slope. Accordingly, the slope adjusted signals are maintained within the acceptable range of the recorder or other such display equipment.

Still further, in the event that the signals are fed into the sample and hold circuit for a period of time extending beyond a sweep of the stylus in one direction (e.g., sample and hold initiated when a sweep was almost completed) and therefore the traverse has reversed and started back during the same computing period, an erroneous value of $Vz$ would be generated. Logical gating circuits are provided which sense a traverse reversal during the "on" time and actuate a warning light which tells the operator to ignore that run and recompute the data.

DESCRIPTION OF A PREFERRED EMBODIMENT

Figure 1:
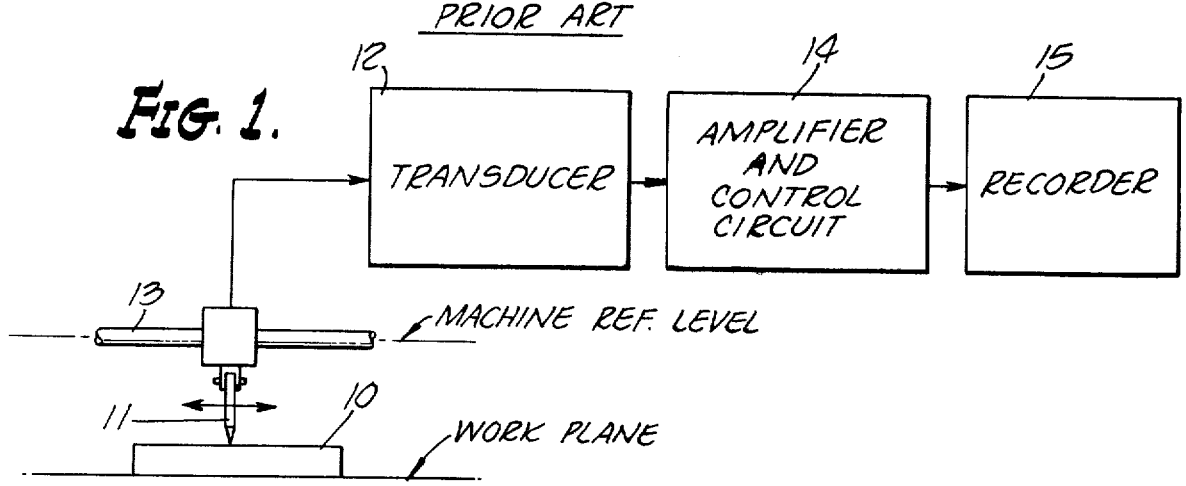
FIG. 1 is a schematic diagram of a typical prior art profile measuring equipment shown scanning the surface of a workpiece.

Turning now to FIG. 1, there is shown there, in schematic form, typical profile measuring equipment. In such equipment, a workpiece or part 10, having a surface to be examined for its profile condition, is located on a substantially horizontal work plane, table or bench. The profile measuring equipment is positioned closely adjacent the part 10 and includes a stylus 11 having a point which rests on the surface of the part 10, the profile of which is to be determined. During operation, the stylus is provided with a precessing-scanning or traversing motion over the part surface while the stylus point remains in contact with the surface. The stylus moves normally with respect to the surface of the part 10 as it scans or traverses the part following the surface contour or profile. These movements of the stylus 11 toward and away from the part surface are converted by a transducer 12 into an electric signal having a magnitude proportional to the extent of stylus movement as measured relative to a bar 13 having a precisely formed surface, the profile reference ways of the equipment. The signals from the transducer after amplification and other processing in the amplifier and control circuits 14 are applied to a suitable recorder 15, such as a pen or chart recorder.

As has been alluded to earlier herein, an essential and difficult matter in using the equipment depicted in FIG. 1 has been that of setting up the work or part 10 parallel with respect to the reference bar 13, i.e., to remove any slope between the two. Also, as has been commented on, this slope removal process was accomplished in the past by physical repositioning of the equipment or workpiece with respect to each other, which not only necessitated adjusting the slope to produce true parallelism with respect to the reference bar 13, but also frequently required vertical readjustment of the stylus 11 with respect to the part surface.

Figures 2, 3:
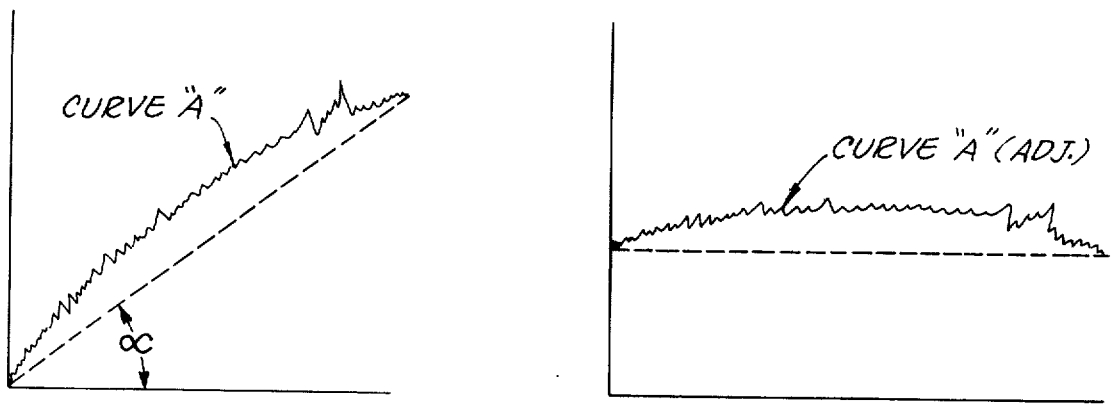
FIG. 2 is a graphical representation of the signal output from profile measuring equipment of FIG. 1.
FIG. 3 is a graph of the information shown in FIG. 2 corrected for slope.

As shown in FIG. 2, a slope exists between the surface of the part 10 being examined and the reference ways or bar 13, display or recording of the profile information (curve A) will also include orientation of the profile information at the slope angle α. It is a desideratum of both the prior art an the specific invention to remove this slope or non-parallelism of the workpiece 10 to the reference ways 12 and produce the profile information (curve A) for presentation as is shown in FIG. 3. That is, when the slope is removed, or has been reduced to zero, and in the case of a chart recording, for example, the profile information recorded then will extend horizontally across the width of the recording paper, which is important for several reasons. First of all, the chart paper usually includes calibrated lines which are printed thereon in a predetermined orientation, and therefore it enhances ease of reading and evaluation of the profile data (high frequency information on curve A) to have the data displayed across the chart paper in a constant direction rather than at varying slopes. Moreover, where the slope is significant, this induces a severe distortion in the profile data as recorded.

The circuit apparatus to be described now are inserted between the amplifier and control circuit 14 and the recorder 15 and are effective to convert the signal information shown in FIG. 2, which includes profile signals with a slope angle α, to the form shown in FIG. 3 with the slope removed, or, α = 0. Also, as will be described, the information signals are maintained within acceptable limits for recording.

Figure 5:
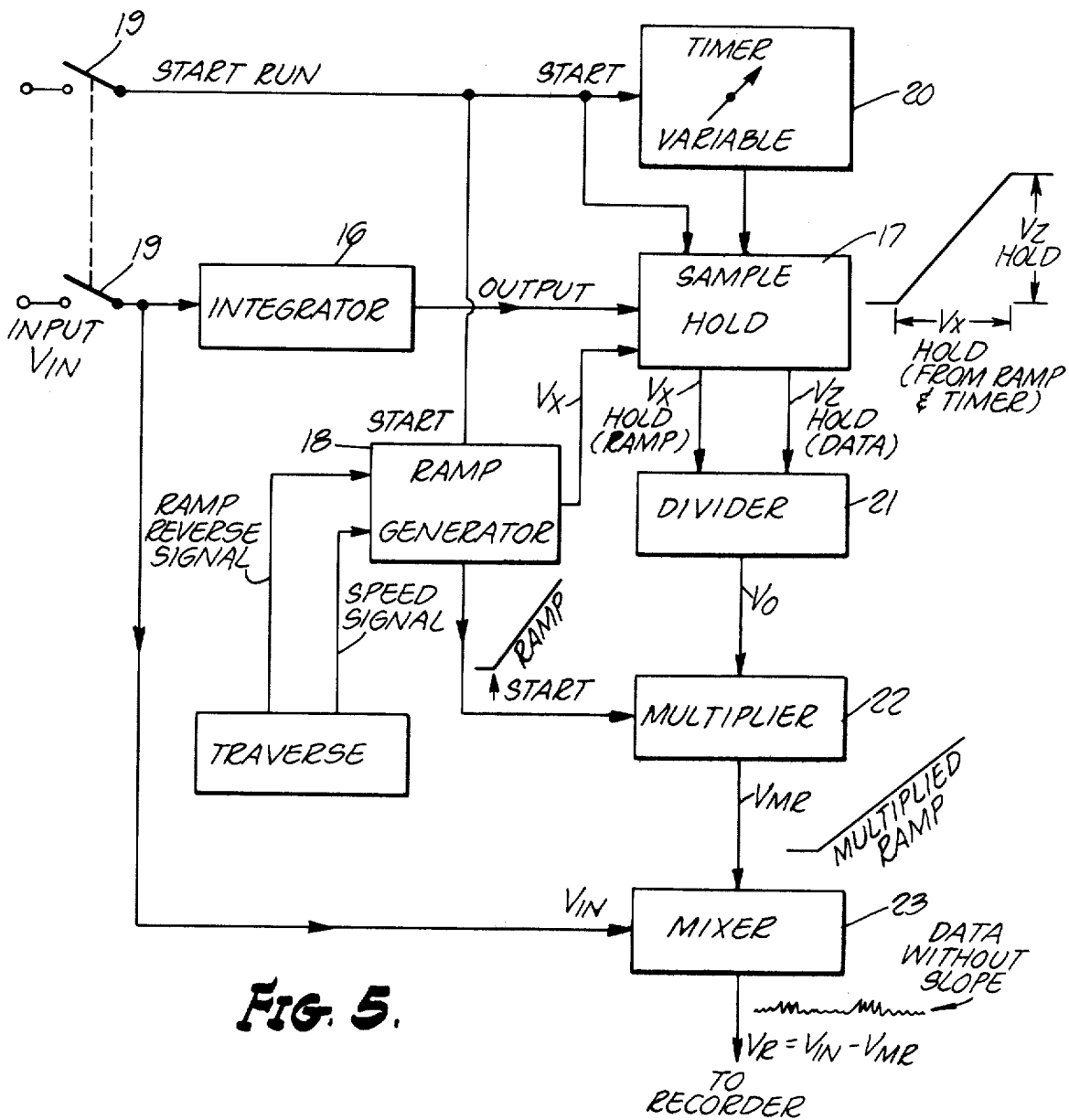
FIG. 5 is a function block diagram of the circuit apparatus of the subject invention.

Reference is now made to FIG. 5 and as an initial condition, it is assumed that the information signals (Vin) from the profile measuring equipment, i.e., the output of amplifier and control circuit 14, includes both profile data and slope information. The profile signal Vin is first applied to an integrator 16 which removes substantially all of the high-frequency information relating to the profile while passing the low-frequency information characteristic of the general slope of the curve A. In this way, the integrator 16 acts as a low-pass filter with the low-frequency or slope information being then applied directly to one input of a sample and hold circuit 17.

Figure 6:
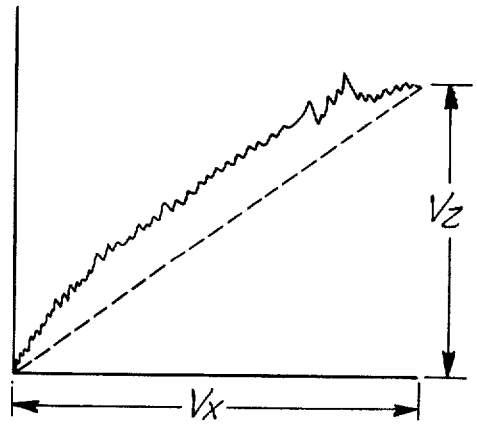
FIG. 6 is a graph of a slope-free signal.

As will be apparent on considering the signal curves shown in FIGS. 2 and 6 with the profile data removed, the low-frequency curve applied to the sample and hold circuit will be a signal which is rising at the angle α, the angle of non-parallelism between the part 10 and the bar 13.

A standard ramp generator 18 produces a rising ramp signal also identified as Vx, of predetermined fixed characteristics, which is a further input to the sample and hold circuit 17. Operation of both the ramp generator and the sample and hold circuit is initiated at the same time by closing switch (Start Run). Simultaneously with closing of the switch 19, the timer 20 is turned on and at the end of a preset time period provides a signal output which stops operation of the sample and hold. That is, at the conclusion of the timer period, the sample and hold circuit provides two signals at its output, namely the value of Vx at the time of turnoff and Vz where these two quantities are the orthogonal components of the slope as shown in FIG. 6.

To understand operation of the sample and hold circuit to provide the values Vx and Vz, it must be appreciated that although in FIG. 5 it would appear that the information signal provided to the integrator via the profile measuring equipment always coincides exactly with the start of a traverse of the stylus and therefore coincident with the closing of the switch 19, this is normally not achieved. What actually occurs is that as the stylus 11 sweeps, closing of the switch 19 is on a random basis so that it can cause the sample and hold circuit to begin operation at any point in the stylus traverse. It is clear that since the ramp generator has constant rise characteristics, the value of Vx which starts at time zero and which is read out of the sample and hold circuit will depend upon the length of time that the sample and hold circuit is energized, the latter as already indicated being under the control of the timer 20. That is, for identical run times as determined by the timer setting, the same values of $V_x$ are read out of the sample and hold circuit. The value of $V_z$, which also starts at time zero with the closing of the switch, is dependent upon the low-frequency characteristics of the signal obtained from the profile measuring equipment as well as the integration time, and will change according to the actual slope change.

The two signals, $V_x$ and $V_z$, are then read into a divider 21 which produces an output $V_o$ corresponding to $V_z$ divided by $V_x$, or, namely, tangent $\alpha$, the slope of the profile measuring equipment signal as shown in FIG. 6.

The signal $V_o$ is then fed into a multiplier 22 which also has, as another input, the ramp signal from the generator 18. The output of the multiplier (VMR) is a new ramp signal which has its amplitude modified in accordance with the product of $V_o$, and can have either a positive (rising) or negative (falling) slope such that VMR is a ramp signal closely corresponding to the curve A without the profile information thereon.

A mixer 23 receives the multiplied ramp signal VMR as well as the input signal from the profile measuring equipment and provides an output which is the difference of these two signals. Therefore, since VMR is equal to the input signal exclusive of the profile information, then the subtraction of VMR from $V_{in}$ provides a resultant $V_r$ which includes only the information or data representative of the measured profile of the part 10.

This resultant or difference signal $V_r$ is then applied to the recorder, providing the desired graphical representation without slope.

Although in the above description it has been assumed that the slope angle $\alpha$ is positive, it is clear that since the stylus 11 sweeps back and forth across the surface, the profile of which is being determined, the actual signal fed into the integrator 16 will be a sawtooth one having a rising slope on one direction of stylus movement and a falling slope on the other traverse. Moreover, it is desirable to produce a continuous signal output with slope removed for both directions of sweeping traverse, rather than just for unidirectional movement of the stylus. Accordingly, switching circuit means associated with the traverse are provided which give a signal output each time the traverse is reversed. This signal, identified in FIG. 5 as RAMP REVERSE SIGNAL, is applied to the ramp generator to produce alternately a positive going ramp at the start of a run or test and a negative going ramp at the traverse return or turn-around, which will produce a continuous output from the mixer 23 representative of profile data alone. Operation for a negative going ramp from 18 is identical to that described for a positive going ramp.

Figure 7:
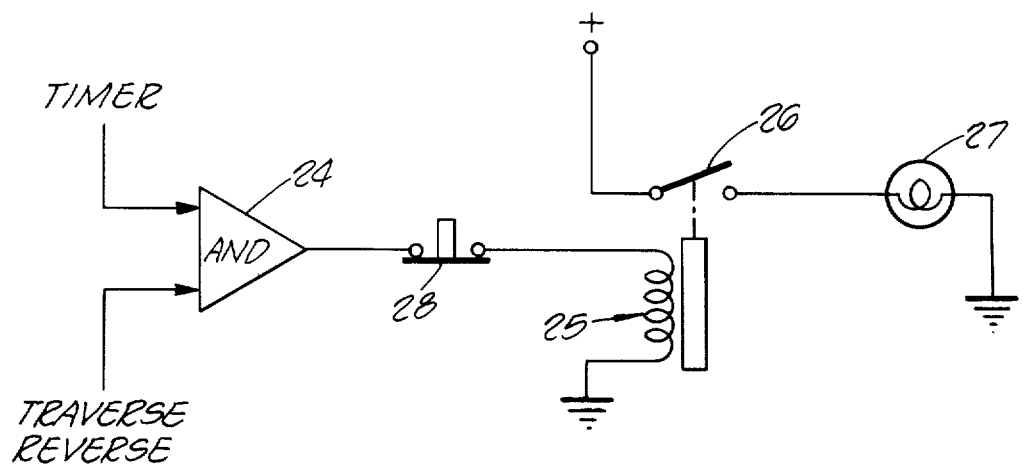
FIG. 7 is a schematic of the warning light energization circuit.

With reference now to FIG. 7, there is shown there a circuit for actuating a warning light in the event that a test run has been initiated at such a point in the traverse that an erroneous value of $V_z$ is generated due to traverse reversal during the test run. As shown there, a logical AND circuit 24 has as a first input the signal from the timer, and as a second input the traverse reverse signal. On coincidence, a gate signal is made available to pick up a relay 25 which provides an energizing path through its points 26 to turn on a warning light 27. Manual operation of reset button 28 turns the warning light off, and the operator then proceeds with a further test run. As already noted, when the operator notes the warning light is on, he is informed that the results being computed by the apparatus will be erroneous and therefore a further test run is required to remove slope.

It is also to be noted that an additional input line to the ramp generator identified as Speed Signal is obtained from the traverse control apparatus. Profile measuring equipment is usually designed in order to operate at several speeds to make it more practical and useful for profile measuring of parts of different size. Thus, for example, common rates of operation are 0.01 inches per second, and 0.1 inches per second. Although the circuit apparatus described can compute a correcting signal at either speed, the input signals to the divider and multiplier circuits are one tenth the amplitude at the slower speed. Because of the parameters of the multiplier and divider circuits, the resultant output signals are less precise with the smaller input signals than with the larger ones. It is sometimes desirable, therefore, to operate the circuits at the higher speed (higher input voltages) followed by shifting to lower speed for detailed readout.

Figure 8:
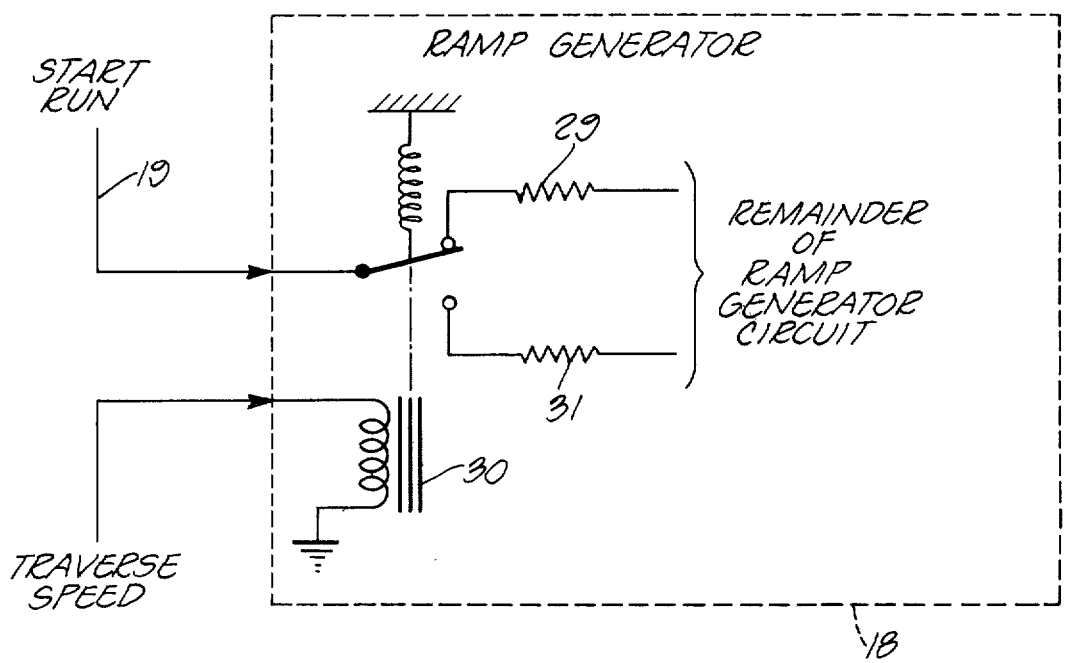
FIG. 8 is a circuit schematic for slow speed operation of the ramp generator.

Reference is now made to FIG. 8 in which there is shown a circuit schematic for controlling the ramp generator 18 and provide a precise operation for either low or high speed traverse. In the usual operation, the ramp generator 18 operates at the "high speed" condition with the generator being designed to provide a predetermined ramp signal of appropriate characteristics for that speed and in which case a resistor 29 is part of the generator circuit. However, when a signal is obtained from the profile measuring equipment, indicating traverse being accomplished at the "slow" speed (TRAVERSE SPEED), this signal picks up a relay 30 which removes the resistor 29 from the generator circuit and inserts a further resistor 31 of different appropriate value, e.g., 10 × resistor 26, to provide a ramp voltage rising (or falling) at a lesser rate than for "high speed". Accordingly, the ramp generator, when operating at the fast speed, will provide a relatively fast rising ramp signal and when the traverse equipment is switched to the low speed, then the operational characteristics of the ramp generator are changed by substituting resistor 31 for 29, which provides a ramp of slower rising characteristics. In this manner, irrespective of which speed the traverse is operated, a suitably precise operation of the entire slope adjustment circuit is obtained.

The ability of the described apparatus to operate at two considerably different speeds of traverse is of particular practical importance. That is, the slope would be first removed where scanning or traversing has been accomplished at the high speed. Subsequently, the operator would shift the traverse to low speed which gives higher resolution and the subject invention would then automatically reduce the slower slope information, thereby providing a final result of exceptionally high accuracy.

Figure 4:
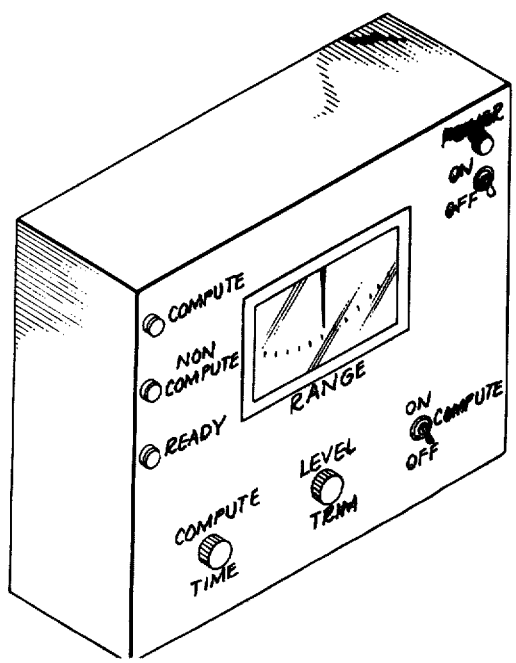
FIG. 4 is a perspective view of the apparatus of the subject invention.

FIG. 4 shows the external control aspects, including a power on-off light and control switch therefor. In addition, a switch such as a toggle switch would be provided for initiating compute or operation of the desired circuit with lights identified as "Compute", "Non-compute" and "Ready", of self evident function. Also, a range dial and needle provides visual monitoring of operation with level trim and compute time adjustments provided for initial setup.

What is claimed is:

1. Circuit apparatus for treating a composite signal having high frequency data on a low frequency slope or drift to remove said slope or drift, comprising:
   a low-pass filter having an input and an output;
   a sample and hold circuit interconnected with said filter to receive the filtered signal therefrom as a first input;
   a ramp generator interconnected to provide a second input to said sample and hold circuit;
   a timer for providing a control signal to said sample and hold circuit for obtaining readout at the end of a predetermined time after actuation of said timer of first and second signals having values corresponding to the orthogonal components of the composite signal slope;
   a switch selectively actuatable to simultaneously energize the ramp generator, the timer and the sample and hold circuit and to interconnect the low-pass filter circuit input with the composite signal;
   means fed by said first and second output signals of said sample and hold circuit to provide a further signal corresponding to the ratio of said first and second signals;
   means fed by the ratio signal and the ramp generator output to provide a further ramp signal of slope corresponding to the ramp generator output multiplied by said ratio signal; and
   means interconnected with said further ramp signal and said composite signal for providing the difference thereof.

2. Circuit apparatus as in claim 1, in which said means to provide a ratio signal includes a divider providing a ratio signal corresponding to the tangent of the composite signal low frequency.

3. Circuit apparatus as in claim 1, in which said means for providing a further ramp includes a multiplier.

4. Circuit apparatus for removing the low frequency slope component from a composite signal including high frequency data comprising:
   a filter having an input an an output and selectively connectable to said composite signal for blocking passage of the high frequency data;
   a sample and hold circuit interconnected with said filter output as a first input;
   a selectively actuatable ramp generator for providing a second input to said sample and hold circuit;
   means for actuating said sample and hold circuit to obtain readout a predetermined time after providing said first and second inputs to said sample and hold circuit, said readout including the instantaneous value ($Vz$) of the filter signal as a first signal and as a second signal ($Vx$) the instantaneous value of the ramp base;
   means selectively actuatable to simultaneously energize the ramp generator and the means for actuating the sample and hold circuit, and to interconnect the filter input with the composite signal;
   means fed by said first and second readout signals of said sample and hold circuit to provide a further signal corresponding to the ration $Vz/Vx$;
   means fed by the ratio signal and the ramp generator output to provide a further ramp signal of slope corresponding to the ramp generator output multiplied by said ratio signal;
   means interconnecting said further ramp signal and said composite signal in subtractive relation.

5. Circuit apparatus for treating a composite signal having high frequency data on a low frequency slope or drift to remove said slope or drift, said composite signal being alternately generated in reverse order, comprising:
   a filter having an input and an output of characteristics passing the drift and blocking the data;
   a sample and hold circuit interconnected with said filter to receive the filtered drift signal therefrom as a first input;
   a selectively energizable ramp generator interconnected with said sample and hold circuit as a second input thereto;
   a timer for providing a control signal to said sample and hold circuit for obtaining readout at the end of a predetermined time after actuation of said timer of first and second signals having values corresponding to the orthogonal components of the composite signal slope;
   a switch selectively actuatable to simultaneously energize the ramp generator, the timer and the sample and hold circuit and to interconnect the filter input with the composite signal;
   means fed by said first and second output signals of said sample and hold circuit to provide a further signal corresponding to the ratio of said first and second signals;
   means interconnected with the ratio signal and the ramp generator output as separate inputs to provide a further ramp signal of slope corresponding to the ramp generator output multiplied by said ratio signal;
   means interconnected with said further ramp signal and said composite signal for providing the difference thereof;
   means for generating a signal each time the composite signal reverses order; and
   means responsive to said reversal signal for activating an alarm indication whenever said reversal signal occurs within the predetermined time after actuation of the timer.

6. Circuit apparatus as in claim 5, in which said means responsive to said reversal signal includes an AND-gate, inputs to which are the reversal signal and a signal coextensive with the timer operation during the predetermined period of time, and the output of said gate being connected to an electrically actuated indicator.

7. Circuit apparatus as in claim 5, in which there are provided further means interconnected with said ramp generator for reversing the ramp generator slope whenever a reversal in traverse direction occurs, to correspond with the reversal in profile data being generated.

8. A method of removing the slope from a composite signal including a high frequency information portion and a low frequency slope which is provided by a transducer scanning a workpiece, comprising:
   developing a composite signal at a first scanning rate;
   forming a first ramp signal corresponding to said composite signal developed at said first scanning rate;
   subtracting said first ramp signal from said first composite signal;

displaying said resultant signal obtained on subtracting said first ramp signal from said first composite signal;

subsequently developing a second composite signal at a second slower scanning rate of said same workpiece;

forming a second ramp signal having a lesser slope than said first ramp signal;

subtracting said second ramp signal from said second composite signal; and displaying and finally recording the difference signal of said second ramp signal and said second composite signal whereby a high precision recording of the high frequency information is obtained.

9. Circuit apparatus for treating a composite signal having high frequency data on a low frequency slope or drift to remove said slope or drift, comprising:

a low-pass filter having an input and an output, said input being fed by the composite signal;

a sample and hold circuit interconnected with said filter output to receive the filtered signal therefrom as a first input;

a first ramp generator providing a second input to said sample and hold circuit;

a timer providing a control signal to said sample and hold circuit for obtaining readout of first and second signals having values corresponding to the orthogonal components of the composite signal slope at the end of a predetermined time after actuation of said timer;

means fed by said first and second output signals of said sample and hold circuit to provide a further signal corresponding to the ratio of said first and second signals;

means fed by the ratio signal and the first ramp generator output to provide a second ramp signal of slope corresponding to the first ramp generator output multiplied by said ratio signal; and means interconnected with said second ramp signal and said composite signal for providing the difference thereof corresponding substantially entirely to the high frequency data with the low frequency slope removed.

10. Circuit apparatus as in claim 9, in which said means to provide a ratio signal includes a divider providing a ratio signal corresponding to the tangent of the composite signal low frequency.

11. Circuit apparatus as in claim 9, in which said means for providing the second ramp includes a multiplier.

* * * * *